United States Patent Office 3,221,051
Patented Nov. 30, 1965

3,221,051
PURIFICATION OF SALICYLANILIDE
Theodore E. Majewski, 3713 Moorland Drive, Edward S. Parsey, 2007 Sharon Court, and Norman E. Skelly, 514 E. Ashman St., all of Midland, Mich.
No Drawing. Filed Mar. 1, 1963, Ser. No. 262,243
5 Claims. (Cl. 260—559)

This invention relates to a method for purifying salicylanilide and it relates particularly to a method for removing a hitherto unrecognized impurity which is found in this material as it is conventionally prepared.

Salicylanilide is ordinarily made by reacting salicylic acid with aniline in the presence of phosphorus trichloride at an elevated temperature. The theoretical proportions of reactants are usually employed for best results, that is, one mole each of aniline and salicylic acid to a third of a mole of phosphorus trichloride. An improved process employs an inert organic solvent as a reaction diluent. The product thereby obtained is apparently of good quality as determined by melting point and ordinary methods of analysis. However, when such a product is used as a chemical intermediate, for example, in preparing halogenated derivatives, troublesome impurities such as halogenated salicylates and the like are often found in the reaction product. Formerly, it was thought that these impurities originated from the splitting of the salicylanilide itself during the reaction, since no corresponding quantity of a parent impurity was known to be present in the starting material.

It has now been discovered by improved methods of analysis that salicylanilide prepared as described above commonly contains as much as three percent by weight or more of salicylanilide salicylate, this compound having the structure shown.

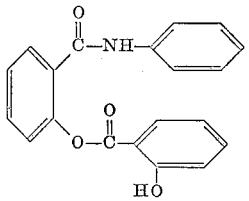

Since this compound is very similar to salicylanilide itself, relatively small concentrations of it in salicylanilide are difficult to detect by many analytical methods and have only slight effect on the melting point.

Recrystallization of the impure salicylanilide is effective to some extent in reducing the amount of this impurity. However, this is not an economically desirable purification procedure for a material used in bulk quantities. According to the present invention, the proportion of this impurity in salicylanilide is substantially reduced or even essentially eliminated by heating the impure salicylanilide with an acidic or basic material selected from the group consisting of lower alkyl tertiary amines, and acidic or basic ion exchange resins. Temperatures of about 50° C. to about 180° C. are operable and heating at about 90–150° C. is preferred, particularly since some of the ion exchange resins become unstable at higher temperatures. The quantity of resin or amine is not critical but best results are obtained by using at least one equivalent weight per equivalent weight of salicylanilide salicylate present.

The process is conveniently carried out in inert solvent solution. Any solvent which is unreactive with salicylanilide or salicylic acid may be used. Preferably, solvents having boiling points within the process range specified above are employed. Suitable solvents include aliphatic, cycloaliphatic, and aromatic hydrocarbons and their chlorinated derivatives such as octane, kerosene, ethylcyclohexane, decahydronaphthalene, benzene, toluene, xylene, carbon tetrachloride, trichloroethylene, perchloroethylene, chlorobenzene, o-dichlorobenzene, and the like. Solvents of other types, for example, ethers of suitable boiling point such as dioxane, may also be used so long as they are unreactive under the process conditions.

The acidic or basic reagents which are suitable for splitting the salicylanilide salicylate impurity include both anion and cation exchange resins and lower alkyl tertiary amines as disclosed above. Preferably, this reagent is an ion exchange resin of either acidic or basic character. These resins, of which there are many commercially available in various types, are cross-linked and therefore insoluble resins which are substituted with acidic or basic groups. For example, cation exchange resins are commonly substituted with sulfonic acid groups while anion exchange resins contain amine or quaternized ammonium substituents. Upon heating the impure salicylanilide with one of these resins, the salicylate impurity is split into salicylanilide and salicylic acid, there being essentially no cleavage of the salicylanilide itself. The resin is then filtered from the reaction solution for reuse and the salicylanilide is separated from the filtrate by any conventional procedure. A method which has been found to be particularly advantageous when an inert solvent is employed includes steam distilling the solvent from the filtrate, thereby obtaining as the distillation residue an aqueous slurry of salicylanilide which is easily filtered to obtain the purified product. Small amounts of liberated salicylic acid are easily removed from the filter cake with a basic wash, aqueous sodium carbonate or bicarbonate being suitable for this purpose.

Trialkylamines are equivalent in this reaction to anion exchange resins and react in the same manner. Suitable amines include triethylamine, tripropylamine, N,N-dimethylbutylamine, tributylamine, and the like. The tertiary amine reactant is conveniently removed from a reaction mixture containing an inert solvent by the steam distillation step described above.

Heating periods of about 1–10 hours are ordinarily sufficient to reduce the salicylate impurity content to an acceptable level. Longer heating times may be employed if desired to ensure the complete removal of this impurity.

By the process here described, the troublesome salicylanilide salicylate impurity can be completely and selectively removed from a salicylanilide product. Although it is known that strong mineral acids or bases are capable of cleaving salicylanilide salicylate (see Anschütz, Berichte, 52, 1890), such reagents are also capable of cleaving salicylanilide itself to aniline and salicylic acid and good yields of a purified product are not easily obtainable as with the present process. For example, this reference shows that salicylic acid and aniline are the only products obtained by warming salicylanilide salicylate with dilute mineral acid.

The following examples illustrate various modes of operating the present invention.

EXAMPLE 1

Fifty grams of salicylanilide containing 3.1% of salicylanilide salicylate was dissolved in 400 g. of chlorobenzene and 10 g. of Dowex 50 ion exchange resin was added. (Dowex 50, a product of The Dow Chemical Company, is a strongly acidic sulfonated crosslinked styrene-divinylbenzene cation exchange resin.) This mixture was heated at reflux temperature for 2 hours. The resin was removed by filtration of the hot mixture and the chlorobenzene was steam distilled from the filtrate, leaving an aqueous slurry of salicylanilide. The slurry was cooled to room temperature and filtered. The salicylanilide filter cake was washed with water, washed with aqueous 15% sodium carbonate to remove salicylic acid, and washed again with water. The dried product weighed 44.8 g. and contained 0.7% salicylanilide salicylate. Its melting point had been improved from 134.7–135.4° C. to 135.8–136.2° C.

EXAMPLE 2

A mixture of 30.7 g. of salicylanilide containing 2.1% of salicylanilide salicylate, 210 ml. of chlorobenzene, and 3.0 g. of triethylamine was refluxed for 3 hours. The chlorobenzene was then removed from the hot solution by steam distillation and the resulting aqueous slurry of salicylanilide was worked up as shown in Example 1. The dried salicylanilide product contained less than 0.1% of salicylanilide salicylate.

EXAMPLES 3–6

By the general procedure shown in Example 1, impure salicylanilide was heated in inert solvent solution with various ion exchange resins. The results are summarized in Table I.

Table I

| Salicylanilide, g. | Resin | Solvent | Reflux time, hrs. | Percent salicylanilide salicylate | |
|---|---|---|---|---|---|
| | | | | Start | Finish |
| 50 | 20 g. Dowex 21K [1] | 350 ml. chlorobenzene | 2 | 2.4 | 0.4 |
| 50 | 10 g. Dowex 3 [2] | 350 ml. chlorobenzene | 2 | 2.4 | 0.7 |
| 50 | 25 g. Dowex 2 [3] | 400 ml. chlorobenzene | 68 | 3.0 | <0.1 |
| 50 | 25 g. Dowex 2 | 200 ml. dioxane | 2 | 2.4 | 0.7 |

[1] Dowex 21K is a strongly basic anion exchange resin consisting of a crosslinked styrene-divinylbenzene resin substituted with quaternized ammonium groups.
[2] Dowex 3 is a weakly basic anion exchange resin consisting of a crosslinked styrene-divinylbenzene resin substituted with mixed primary, secondary, and tertiary amino groups.
[3] Dowex 2 is similar in nature and structure to Dowex 21K.

The above examples are illustrative of the practice of the present invention but are not to be construed necessarily as limiting the scope thereof.

We claim:

1. In a process wherein a mixture comprising aniline, salicylic acid, and phosphorus trichloride is heated at an elevated temperature to produce a crude salicylanilide product, the improvement of contacting said crude salicylanilide in inert solvent solution with a substance selected from the group consisting of tri(lower alkyl) amines, anion exchange resins, and cation exchange resins at a temperature of about 50–180° C.

2. The process of claim 1 wherein the crude salicylanilide is contacted with an anion exchange resin.

3. The process of claim 1 wherein the crude salicylanilide is contacted with a cation exchange resin.

4. The process of claim 1 wherein the crude salicylanilide is contacted with a tri(lower alkyl) amine.

5. The process of claim 4 wherein the amine is triethylamine.

References Cited by the Examiner

UNITED STATES PATENTS 2,763,683  9/1956  Beman et al. _____ 260—559

FOREIGN PATENTS 818,299  8/1959  Great Britain.

OTHER REFERENCES

Calmon et al.: "Ion Exchangers in Organic and Biochemistry," pages 3–4, 7–9 and 640–643 (1957), Interscience Publishers, Inc., New York.

WALTER A. MODANCE, *Primary Examiner.*

NICHOLAS S. RIZZO, *Examiner.*